United States Patent
Kim et al.

(10) Patent No.: US 12,136,129 B1
(45) Date of Patent: *Nov. 5, 2024

(54) DISESTABLISHING ENTITY'S SELECTED RESOURCE COMPUTATION IN RESPONSE TO LOSS OF NEXUS ESTABLISHMENT CONDITION FOR SELECTED DOMAIN

(71) Applicant: Avalara, Inc., Seattle, WA (US)

(72) Inventors: Stefan Kim, Maple Valley, WA (US); Nikki Nash, Bremerton, WA (US)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,487

(22) Filed: Jun. 15, 2023

Related U.S. Application Data

(63) Continuation of application No. 17/888,154, filed on Aug. 15, 2022, now Pat. No. 11,720,976, which is a
(Continued)

(51) Int. Cl.
*G06Q 40/12* (2023.01)
*G06F 16/23* (2019.01)

(52) U.S. Cl.
CPC ......... *G06Q 40/12* (2013.12); *G06F 16/2365* (2019.01); *G06Q 40/123* (2013.12)

(58) Field of Classification Search
None
See application file for complete search history.

(56) References Cited

U.S. PATENT DOCUMENTS

| | | | |
|---|---|---|---|
| 5,335,169 A | * | 8/1994 | Chong ............... G06Q 40/02 705/31 |
| 6,236,365 B1 | | 5/2001 | Leblanc et al. |
| (Continued) | | | |

FOREIGN PATENT DOCUMENTS

WO 2013/163625 A1 10/2013

OTHER PUBLICATIONS

"Sales and Transactions Checker for Economic Nexus," TaxJar, Feb. 19, 2019, https://www.taxjar.com/sales-and-transactions-checker/, 8 pages.
(Continued)

*Primary Examiner* — Paul S Schwarzenberg
(74) *Attorney, Agent, or Firm* — Jeremiah J. Baunach; Frontier IP Law PLLC

(57) ABSTRACT

A service engine determines that an entity meets a first nexus establishment condition for a first domain and a second nexus establishment condition for a second domain. The service engine then computes a first selected resource for the first domain and a second selected resource for the second domain. When the service engine determines that the entity no longer meets the second nexus establishment condition for the second domain, the service engine determines a nexus-ending date for the second domain. Prior to the nexus-ending date being satisfied, the service engine continues to compute the first selected resource for the first domain and the second selected resource for the second domain. In response to the nexus-ending date being satisfied, the service engine computes the first selected resource for the first domain but does not compute the second selected resource for the second domain.

14 Claims, 8 Drawing Sheets

Related U.S. Application Data continuation of application No. 16/834,934, filed on Mar. 30, 2020, now Pat. No. 11,526,950.

(60) Provisional application No. 62/964,544, filed on Jan. 22, 2020.

(56) References Cited

U.S. PATENT DOCUMENTS

| | | | |
|---|---|---|---|
| 6,993,502 B1* | 1/2006 | Gryglewicz | G06Q 20/207 |
| | | | 705/19 |
| 7,200,569 B2 | 4/2007 | Gallagher et al. | |
| 7,257,553 B1 | 8/2007 | Baker | |
| 7,337,910 B2 | 3/2008 | Cartmell et al. | |
| 7,516,242 B2 | 4/2009 | Furukawa et al. | |
| 7,606,741 B2 | 10/2009 | King et al. | |
| 7,783,536 B2 | 8/2010 | William et al. | |
| 7,933,803 B1 | 4/2011 | Nadler et al. | |
| 7,945,536 B2 | 5/2011 | Bao et al. | |
| 8,099,342 B1 | 1/2012 | Christian et al. | |
| 8,265,974 B2 | 9/2012 | Wadhwani et al. | |
| 8,386,344 B2* | 2/2013 | Christian | G06Q 40/123 |
| | | | 705/31 |
| 8,458,337 B2 | 6/2013 | Corley et al. | |
| 8,526,405 B2 | 9/2013 | Curtis et al. | |
| 8,528,047 B2 | 9/2013 | Terzis et al. | |
| 8,613,044 B2 | 12/2013 | Casey et al. | |
| 8,620,578 B1 | 12/2013 | Brown et al. | |
| 8,725,407 B2 | 5/2014 | Hurley et al. | |
| 8,751,399 B2 | 6/2014 | Kolhatkar et al. | |
| 8,849,862 B2 | 9/2014 | Visscher | |
| 8,904,493 B1 | 12/2014 | Dibble | |
| 9,101,834 B2 | 8/2015 | Letourneau et al. | |
| 9,323,428 B1 | 4/2016 | Maguire et al. | |
| 9,342,367 B2 | 5/2016 | Koneti et al. | |
| 9,613,190 B2 | 4/2017 | Ford et al. | |
| 9,734,169 B2 | 8/2017 | Redlich et al. | |
| 9,760,915 B2 | 9/2017 | Pavlou et al. | |
| 9,762,553 B2 | 9/2017 | Ford et al. | |
| 10,033,702 B2 | 7/2018 | Ford et al. | |
| 10,043,035 B2 | 8/2018 | Lafever et al. | |
| 10,332,216 B2 | 6/2019 | Barsade et al. | |
| 10,374,968 B1 | 8/2019 | Duerk et al. | |
| 10,445,818 B1 | 10/2019 | Chowdhary | |
| 10,572,684 B2 | 2/2020 | Lafever et al. | |
| 10,572,953 B1 | 2/2020 | Char et al. | |
| 10,614,130 B1 | 4/2020 | Pai et al. | |
| 10,628,582 B2 | 4/2020 | Reybok et al. | |
| 10,764,254 B2 | 9/2020 | Ford et al. | |
| 10,769,611 B2 | 9/2020 | McNeel | |
| 10,789,590 B2 | 9/2020 | Tran et al. | |
| 10,872,100 B1 | 12/2020 | Shefferman et al. | |
| 10,997,251 B2 | 5/2021 | Tran et al. | |
| 11,030,341 B2 | 6/2021 | Lafever et al. | |
| 11,106,794 B2 | 8/2021 | Chow | |
| 11,176,620 B1 | 11/2021 | Lubczynski et al. | |
| 11,238,542 B1 | 2/2022 | Wixted et al. | |
| 11,431,812 B2 | 8/2022 | Kavounas et al. | |
| 11,455,410 B2 | 9/2022 | Turgeman et al. | |
| 11,463,375 B1 | 10/2022 | Kushniruk et al. | |
| 11,475,430 B2 | 10/2022 | Burton et al. | |
| 11,514,448 B1 | 11/2022 | Liberman | |
| 11,632,419 B1 | 4/2023 | Robles et al. | |
| 11,853,302 B1 | 12/2023 | Nash et al. | |
| 2001/0005675 A1 | 6/2001 | Aho | |
| 2001/0034767 A1 | 10/2001 | Aho | |
| 2002/0116456 A1 | 8/2002 | Morita | |
| 2002/0138649 A1 | 9/2002 | Cartmell et al. | |
| 2002/0138765 A1 | 9/2002 | Fishman et al. | |
| 2003/0055754 A1 | 3/2003 | Sullivan | |
| 2003/0093320 A1 | 5/2003 | Sullivan | |
| 2003/0101112 A1 | 5/2003 | Gallagher et al. | |
| 2003/0144931 A1* | 7/2003 | Stokes | G06Q 40/123 |
| | | | 705/31 |
| 2004/0004967 A1 | 1/2004 | Nakatsugawa et al. | |
| 2004/0083306 A1 | 4/2004 | Gloe | |
| 2004/0179539 A1 | 9/2004 | Takeda et al. | |
| 2004/0215707 A1 | 10/2004 | Fujita et al. | |
| 2005/0125335 A1 | 6/2005 | Bross et al. | |
| 2005/0255811 A1 | 11/2005 | Allen et al. | |
| 2006/0053208 A1 | 3/2006 | Laurila et al. | |
| 2006/0085275 A1 | 4/2006 | Stokes et al. | |
| 2006/0235776 A1 | 10/2006 | Temme | |
| 2006/0282900 A1 | 12/2006 | Johnson et al. | |
| 2007/0073892 A1 | 3/2007 | Laurila et al. | |
| 2007/0124294 A1 | 5/2007 | Sun et al. | |
| 2007/0136158 A1 | 6/2007 | Rawlings et al. | |
| 2007/0136159 A1 | 6/2007 | Rawlings et al. | |
| 2007/0136475 A1 | 6/2007 | Leppisaari et al. | |
| 2007/0203718 A1 | 8/2007 | Merrifield, Jr. | |
| 2007/0239464 A1 | 10/2007 | Carroll | |
| 2008/0104124 A1 | 5/2008 | Bao et al. | |
| 2008/0154754 A1* | 6/2008 | William | G06Q 40/123 |
| | | | 705/31 |
| 2009/0006467 A1 | 1/2009 | Visscher | |
| 2009/0024698 A1 | 1/2009 | Ho et al. | |
| 2009/0067395 A1 | 3/2009 | Curtis et al. | |
| 2009/0076965 A1 | 3/2009 | Elson et al. | |
| 2009/0082008 A1 | 3/2009 | Thorell | |
| 2009/0138307 A1 | 5/2009 | Belcsak et al. | |
| 2009/0187500 A1 | 7/2009 | Wilson et al. | |
| 2009/0279455 A1 | 11/2009 | Wang et al. | |
| 2010/0095359 A1 | 4/2010 | Gordon | |
| 2010/0211634 A1 | 8/2010 | Song et al. | |
| 2011/0022485 A1 | 1/2011 | Von et al. | |
| 2011/0187864 A1 | 8/2011 | Snider | |
| 2012/0011518 A1 | 1/2012 | Duan et al. | |
| 2012/0179801 A1 | 7/2012 | Luna et al. | |
| 2012/0239731 A1 | 9/2012 | Shyamsunder et al. | |
| 2013/0013471 A1 | 1/2013 | Fishman | |
| 2013/0061179 A1 | 3/2013 | Alletto et al. | |
| 2013/0086380 A1 | 4/2013 | Krishnaswamy et al. | |
| 2013/0191883 A1 | 7/2013 | Tung | |
| 2013/0268357 A1 | 10/2013 | Heath | |
| 2013/0281115 A1 | 10/2013 | Dupray et al. | |
| 2013/0290200 A1 | 10/2013 | Singhal et al. | |
| 2013/0317944 A1 | 11/2013 | Huang et al. | |
| 2013/0346608 A1 | 12/2013 | Tung | |
| 2014/0094199 A1 | 4/2014 | Palanki et al. | |
| 2014/0172526 A1 | 6/2014 | Arrocho et al. | |
| 2014/0172656 A1 | 6/2014 | Shaw | |
| 2014/0222524 A1 | 8/2014 | Pluschkell et al. | |
| 2014/0289386 A1 | 9/2014 | Vatto et al. | |
| 2014/0337189 A1 | 11/2014 | Barsade et al. | |
| 2014/0351105 A1 | 11/2014 | Hamm | |
| 2015/0019591 A1 | 1/2015 | Visscher | |
| 2015/0058931 A1 | 2/2015 | Miu et al. | |
| 2015/0163206 A1 | 6/2015 | McCarthy et al. | |
| 2015/0310188 A1 | 10/2015 | Ford et al. | |
| 2016/0042466 A1 | 2/2016 | Herndon et al. | |
| 2016/0062949 A1 | 3/2016 | Smith et al. | |
| 2016/0099963 A1 | 4/2016 | Mahaffey et al. | |
| 2016/0140668 A1 | 5/2016 | Maguire et al. | |
| 2016/0179874 A1 | 6/2016 | Lynch | |
| 2017/0041296 A1 | 2/2017 | Ford et al. | |
| 2017/0140471 A1 | 5/2017 | Hemberg et al. | |
| 2017/0142076 A1 | 5/2017 | Ford et al. | |
| 2017/0272316 A1 | 9/2017 | Johnson et al. | |
| 2017/0272485 A1 | 9/2017 | Gordon et al. | |
| 2017/0330121 A1 | 11/2017 | Sullivan et al. | |
| 2018/0096175 A1 | 4/2018 | Schmeling et al. | |
| 2018/0150647 A1 | 5/2018 | Naqvi et al. | |
| 2018/0176099 A1 | 6/2018 | Guo et al. | |
| 2018/0246479 A1 | 8/2018 | Judd et al. | |
| 2018/0307859 A1 | 10/2018 | Lafever et al. | |
| 2018/0367506 A1 | 12/2018 | Ford et al. | |
| 2019/0114609 A1 | 4/2019 | Burton et al. | |
| 2019/0222560 A1 | 7/2019 | Ford et al. | |
| 2019/0332807 A1 | 10/2019 | Lafever et al. | |
| 2020/0117690 A1 | 4/2020 | Tran et al. | |
| 2020/0328951 A1 | 10/2020 | Vishwakarma | |
| 2020/0349572 A1 | 11/2020 | O'Sullivan et al. | |
| 2020/0356974 A1* | 11/2020 | McNeel | G06Q 20/207 |
| 2020/0387527 A1 | 12/2020 | Visscher | |

(56) References Cited

U.S. PATENT DOCUMENTS

| | | |
|---|---|---|
| 2020/0387896 A1 | 12/2020 | Tran et al. |
| 2021/0082051 A1 | 3/2021 | Moses |
| 2021/0158456 A1 | 5/2021 | Morgan et al. |
| 2021/0233181 A1* | 7/2021 | Bubalo ............... G06F 40/289 |
| 2023/0403337 A1 | 12/2023 | Kavounas et al. |

OTHER PUBLICATIONS

"What is Nexus?" Sales Tax Institute, Aug. 26, 2019, https://www.salestaxinstitute.com/sales_tax_faqs/what_is_nexus, 6 pages.

Deseir, "Digital Transformation Challenges in Large and Complex Organizations", 2018.

Ellen Wixted et al., "Online Interactive Notification Platform for Exploring Possible Tax Nexus and Implications," U.S. Appl. No. 16/775,771, filed Jan. 29, 2020. (111 pages).

International Preliminary Report on Patentability received for PCT Patent Application No. PCT/US2021/040168, mailed on Jan. 12, 2023, 9 pages.

International Search Report and Written Opinion received for PCT Patent Application No. PCT/US2021/040168, mailed on Oct. 22, 2021, 10 pages.

Maccarrone, "The Impact of the U.S. Supreme Court's Decision in *South Dakota v. Wayfair*," 2021, retrieved from https://www.cpajournal.com/2021/04/26/the-impace-of-the-u-s-supreme-courts-decision-in-south-dakota-v-wayfair/, 11 pages.

Morgan et al., "Assembling Parameters to Compute Taxes for Cross-Border Sales," U.S. Appl. No. 16/696,062, filed Nov. 26, 2019, 75 pages.

Nash, Nikki, et al., "Automatically Starting Activities Upon Crossing Threshold", U.S. Appl. No. 17/338,220, filed Jun. 3, 2021, 107 pages.

Pichan et al., "Cloud Forensics: Technical Challenges, solutions, and comparative analysis", Digital Investigation, vol. 13, Jun. 2015, pp. 38-57.

Sales Tax Institute, "How do I know if I should be collecting tax in a state", Sales Tax Institute, Aug. 12, 2017, 2 pages.

Seth Therrien et al., "Tax Nexus Notification Platform," U.S. Appl. No. 16/585,829, filed Sep. 27, 2019. (72 pages).

Smith, "Due Process Implications Related to State Notice and Economic Nexus Laws," Tax Lawyer 70(4):833-868, 2017.

Stefan Kim et al., "Disestablishing Entity's Selected Resource Computation in Response to Loss of Nexus Establishment Condition for Selected Domain," U.S. Appl. No. 16/834,934, filed Mar. 30, 2020. (63 pages).

Taxconnex, "Sales Tax Nexus Guide", taxconnex, Whitepaper, 2019, 18 pages.

The Seller's Guide to eCommerce Sales Tax, TaxJar, Jun. 18, 2019, https://www.taxiar.com/guides/intro-to-sales-tax/, 19 pages.

Yetter, "Sales Tax Institute helps you understand sales and use tax obligations," YouTube Video, Dec. 15, 2011, URL= https://www.youtube.com/watch?v=gKFe1W062Ok&feature=emb_logo, download date Sep. 10, 2019, 1 page. (Screenshot).

Hu et al, "Game Theoretic Analysis for Offense-Defense Challenges of Algorithm Contests on TopCoder", 2015 IEEE Symposium on Science Oriented System Engineering Mar. 2015, IEEE Publiishing.

* cited by examiner

DISESTABLISHING ENTITY'S SELECTED RESOURCE COMPUTATION IN RESPONSE TO LOSS OF NEXUS ESTABLISHMENT CONDITION FOR SELECTED DOMAIN

SUMMARY

Businesses often have to compute an amount of a resource that is realized in different domains, whether it be computing taxes from making, selling, buying, or using goods to computing cloud computing resource utilization. Businesses generally collect information relating to their operations, such as by using enterprise resource planning ("ERP") software applications or accounting applications. ERP applications manage information relating to a business's activities, such as sales, resource management, production, inventory management, delivery, billing, and so on. Accounting applications manage a business's accounting information, such as purchase orders, sales invoices, payroll, accounts payable, accounts receivable, and so on. ERP applications, accounting applications, ecommerce applications and other conventionally used applications fail to provide accurate, reliable per-domain resource compliance information in a timely and efficient manner according to the various different rules in various different domains.

To solve the above technical problems, disclosed herein is method comprising: determining, by a computer system, that an entity has met a first nexus establishment condition for a first domain and has met a second nexus establishment condition for a second domain; computing, by the computer system, a first selected resource for the first domain and a second selected resource for the second domain during a first time period associated with meeting the first nexus establishment condition and the second nexus establishment condition; determining, by the computer system, that the entity no longer meets the second nexus establishment condition for the second domain after the first time period; determining, by the computer system and in response to the determination that the entity no longer meets the second nexus establishment condition for the second domain, a nexus-ending date for the second domain based on stored rules regarding a nexus-ending date for the second domain; computing, by the computer system, the first selected resource for the first domain and the second selected resource for the second domain during a second time period after the first time period and prior to the nexus-ending date; and computing, by the computer system, the first selected resource for the first domain without computing the second selected resource for the second domain during a third time period after the nexus-ending date based on the determination that the entity no longer meets the second nexus establishment condition for the second domain after the first time period and on the determined nexus-ending date for the second domain.

Also, disclosed herein is a system comprising at least one processor and a memory coupled to the at least one processor. The memory stores instructions that, when executed by the at least one processor, cause the system to perform operations comprising: determining, by a computer system, that an entity has met a first nexus establishment condition for a first domain and has met a second nexus establishment condition for a second domain; computing, by the computer system, a first selected resource for the first domain and a second selected resource for the second domain during a first time period associated with meeting the first nexus establishment condition and the second nexus establishment condition; determining, by the computer system, that the entity no longer meets the second nexus establishment condition for the second domain after the first time period; determining, by the computer system and in response to the determination that the entity no longer meets the second nexus establishment condition for the second domain, a nexus-ending date for the second domain based on stored rules regarding a nexus-ending date for the second domain; computing, by the computer system, the first selected resource for the first domain and the second selected resource for the second domain during a second time period after the first time period and prior to the nexus-ending date; and computing, by the computer system, the first selected resource for the first domain without computing the second selected resource for the second domain during a third time period after the nexus-ending date based on the determination that the entity no longer meets the second nexus establishment condition for the second domain after the first time period and on the determined nexus-ending date for the second domain.

Also disclosed herein is a non-transitory computer-readable storage medium having computer-executable instructions stored thereon that, when executed by at least one processor, cause the at least one processor to perform operations comprising: determining, by a computer system, that an entity has met a first nexus establishment condition for a first domain and has met a second nexus establishment condition for a second domain; computing, by the computer system, a first selected resource for the first domain and a second selected resource for the second domain during a first time period associated with meeting the first nexus establishment condition and the second nexus establishment condition; determining, by the computer system, that the entity no longer meets the second nexus establishment condition for the second domain after the first time period; determining, by the computer system and in response to the determination that the entity no longer meets the second nexus establishment condition for the second domain, a nexus-ending date for the second domain based on stored rules regarding a nexus-ending date for the second domain; computing, by the computer system, the first selected resource for the first domain and the second selected resource for the second domain during a second time period after the first time period and prior to the nexus-ending date; and computing, by the computer system, the first selected resource for the first domain without computing the second selected resource for the second domain during a third time period after the nexus-ending date based on the determination that the entity no longer meets the second nexus establishment condition for the second domain after the first time period and on the determined nexus-ending date for the second domain.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Determining resource compliance in various different domains for an entity according to various different nexus rules for each domain, and communicating such information to the entity in real-time or near real time as resources are being tracked and as nexus rules are changing, presents a technical problem in order to do so in a timely and efficient manner over computer networks and in a way that integrates well into existing technical environments in which resource computation assistance is provided. The present disclosure provides systems and methods that solve this technical problem by increasing the speed, efficiency and accuracy of such specialized software platforms and computer networks.

Figure 1:
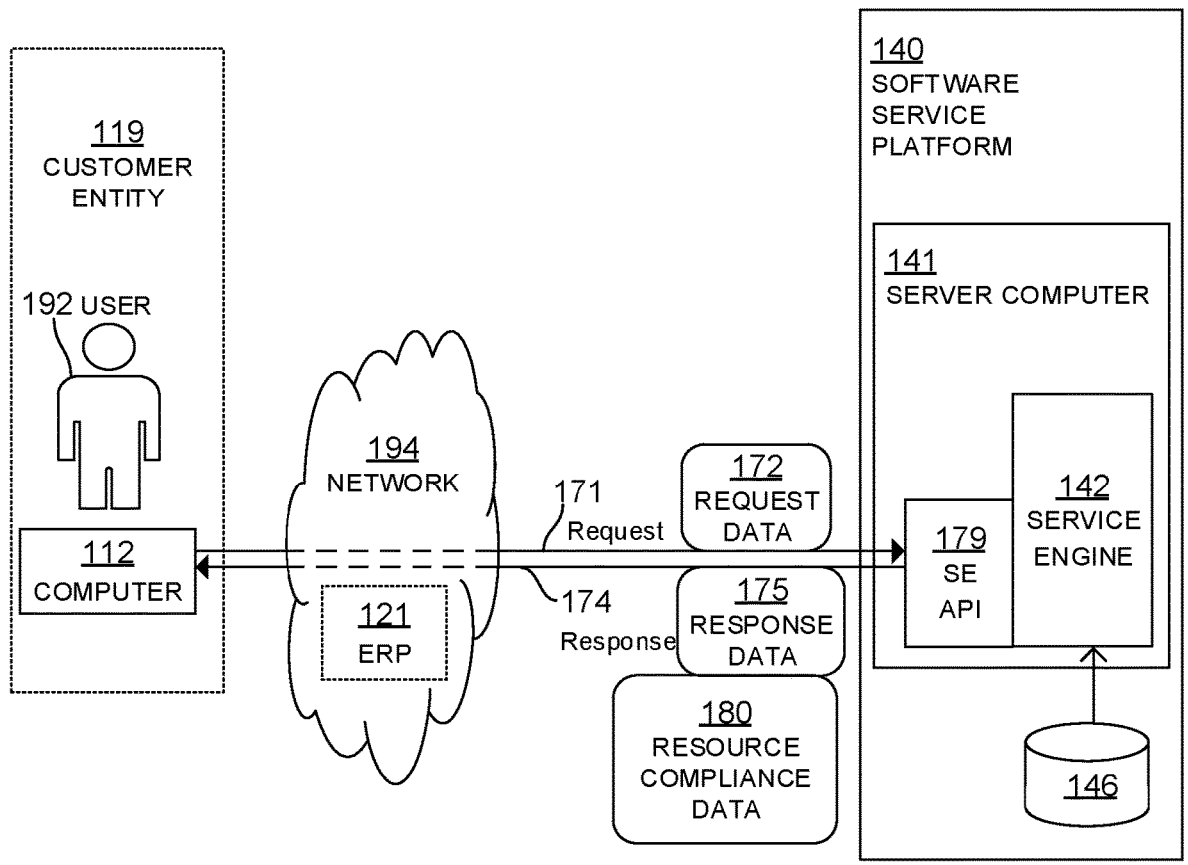
FIG. 1 is a block diagram showing an example configuration according to various embodiments of the present disclosure.

FIG. 1 is a block diagram showing an example configuration that generates resource compliance data 180, according to various embodiments of the present disclosure.

A sample customer entity 119 includes a computer 112, and a user 192 who may use computer 112. Both could be located within a physical site of the customer entity 119, but that is not necessary. More details about computer 112 are provided with reference to FIG. 2.

In this example, a network 194 is a communications network. Network 194 can be any type of network, such as a local area network (LAN), a metropolitan area network (MAN), a wide area network (WAN), or the internet. In some embodiments, network 194 is considered to be the cloud. An Enterprise Resource Planning (ERP) system 121 may also be within network 194, if it is the cloud, or accessible by computer 112 via network 194.

In this example, a software service platform 140 is implemented by a server computer 141 and a database 146 storing data. Software service platform 140 can be implemented in the cloud, on the premises of a provider, in a combination of the two, and so on. Of course, additional server computers may be used for a single service, for example in a peer-to-peer configuration, with the operations of the service distributed among them. The server computers can be located at a single geographic location or be distributed across multiple locations. Similarly, additional databases may be used for the service, and so on.

Server computer 141 is configured, by software, to implement a new service engine 142. Service engine 142 is configured to perform a predefined service. The service can be a computation, a search, a verification, a registration, a payment, a notification, generation of specialized information and so on. According to various embodiments of the present disclosure, the service may be determining or generating information about resource compliance of customer entity 119 in various domains based on rules about meeting nexus establishment conditions for those domains. In some embodiments, the transmission of such information may alert the customer entity 119 of the potential lack of resource compliance and how resources are to be computed when a nexus establishment condition is not met. The resource compliance data 180 may be or include such information about resource compliance.

In the context of FIG. 1, user 192 desires the service, and may even pay for it. User 192 uses computer 112 to access network 194 and, from network 194, to access software service platform 140. It will be appreciated that, in some contexts, service engine 142 performs cloud computing and is provided as software as a service (SaaS). Moreover, computer 112 can be viewed as a client computer from the perspective of software service platform 140.

The service of service engine 142 can be performed responsive to service engine 142 being properly invoked. While being performed, the service may use data from database 146.

Server computer 141 further hosts a service engine (SE) Application Programming Interface (API) 179. In some embodiments, SE API 179 is configured to invoke service engine 142 to perform its service, when properly requested. In various embodiments, service engine 142 may perform its service without invocation by SE API 179. For example, service engine 142 may also or instead automatically invoke itself to perform the applicable service periodically and/or in response to one or more various conditions being satisfied, including, but not limited to, one or more of: a detected change or update to stored rules about one or more nexus establishment conditions for one or more domains; a detected change or update to information associated with the customer entity 119 that may result in a change in the computed resources for a certain domain; one or more thresholds being met, within a predetermined threshold of being met, or being exceeded regarding information associated with meeting or failing to meet a nexus establishment condition in a certain domain; conditions indicated by stored preferences of customer entity 119, etc.

SE API 179 is configured to receive a request 171, which is shown as an arrow. Request 171 may be transmitted via network 194. Request 171 may have been ultimately caused to be generated by computer 112, for example as operated by user 192. In some embodiments, request 171 is transmitted via network 194 directly to SE API 179. In other embodiments, computer 112 causes ERP system 121 to transmit request 171. In yet other embodiments, ERP system 121 originates request 171 on behalf of customer entity 119.

Request 171 may also include associated request data 172. When SE API 179 receives request 171 with its request data 172, it invokes service engine 142. When thus invoked, service engine 142 may perform its service using request data 172. In response, SE API 179 can be configured to transmit a response 174, also shown as an arrow. Response 174 may include response data 175 that arises out of the service, such as a computed result, a confirmation, and so on. Response 174 can be transmitted back to the sender of request 171, or as otherwise directed.

In some embodiments, the request 171 may be automatically generated and transmitted, such as by the ERP system 121 and/or computer 112 in response to one or more various conditions being satisfied, including, but not limited to, one or more of: a detected change or update to stored rules about one or more nexus establishment conditions for one or more domains; a detected change or update to information associated with the customer entity 119 that may result in a change in the computed resources for a certain domain; one or more thresholds being met, within a predetermined threshold of being met, or being exceeded regarding information associated with meeting or failing to meet a nexus establishment condition in a certain domain; conditions indicated by stored preferences of customer entity 119, etc.

In response to such a request being automatically generated, or in response to the service engine 142 invoking itself, the service engine 142 may generate and/or transmit resource compliance data 180. For example, resource compliance data 180 may be or include information about the customer entity 119 meeting or failing to meet a nexus establishment condition for one or more domains, nexus-ending dates, prompts for information regarding whether the service is to compute resources for a domain after the customer entity no longer meets a nexus establishment condition, updates or changes to the rules regarding nexus establishment conditions for a domain, etc.

In some embodiments, the resource compliance data 180 may be used to update information regarding an account associated with the customer entity 119. The account associated with the customer entity 119 may be accessible by the customer entity 119 via a client computing device, for example, the computer 112, wherein the updated information is for display on a user interface associated with the account. Such a user interface may, in various embodiments, be a user interface of the server computer 141, computer 112, and/or a computer in ERP system 121, and so on. Furthermore, the account associated with the customer entity 119 may be managed, stored and/or accessible by the server computer 141, computer 112, and/or a computer in ERP system 121, and so on.

Computer program code for carrying out operations for aspects of the present disclosure may be written in any combination of one or more programming languages, including an object-oriented programming language such as Java, Smalltalk or the like, and/or conventional procedural programming languages, such as the "C" programming language or similar programming languages such as C++, C sharp, etc. Portions of the program code may be executed on server computer 141, computer 112, a computer in ERP system 121, and so on.

Additional details about the components of FIG. 1, which may be known to some, are provided near the end of this description, for not interrupting the flow of this description at this stage.

Figure 2:
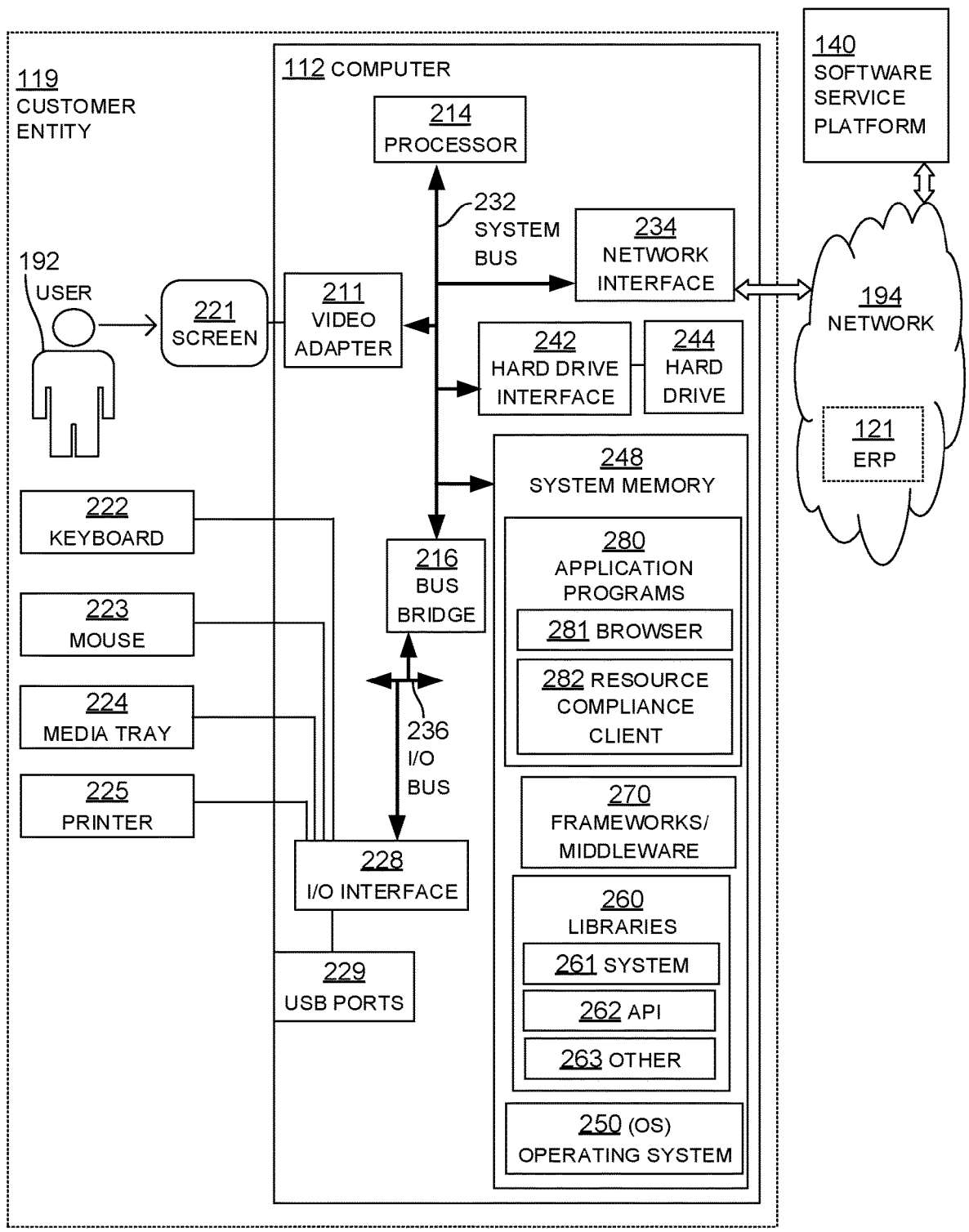
FIG. 2 is a block diagram showing more details of a computer of an example customer entity of FIG. 1, with reference to the communication network and the software service platform, according to various embodiments of the present disclosure.

FIG. 2 is a block diagram showing more details of a computer 112 of an example customer entity 119 of FIG. 1, with reference to the communication network 194 and the software service platform 140, according to various embodiments of the present disclosure.

FIG. 2 shows customer entity 119 of FIG. 1, along with more sample details for computer 112. Computer 112 may be a desktop computer, a laptop computer, a tablet computer, a mobile phone, and so on.

Computer 112 includes a processor 214. Computer 112 also includes a system bus 232 that is coupled to processor 214. System bus 232 can be used by processor 214 to control and/or communicate with other components of computer 112.

Computer 112 additionally includes a network interface 234 that is coupled to system bus 232. Network interface 234 can be implemented by a hardware network interface, such as a network interface card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on. Network interface 234 can access network 194.

Also shown is a resource compliance client 282 residing in system memory 248, which may comprise computer-executable instructions executed by processor 214 to invoke or otherwise obtain services of the software service platform 140 provided by the service engine 142 running on server computer 141 of the software service platform 140. For example, the resource compliance client 282 may obtain and/or invoke the software service platform 140 to generate and/or transmit resource compliance data 180. In some embodiments, the resource compliance client 282 may generate a user interface for and/or provide access to an account associated with the customer entity 119 through which the resource compliance data 180 for the customer entity 119 may be accessible by the customer entity 119 via the computer 112. For example, information indicating whether the customer entity 119 has meet a nexus establishment condition, information indicating whether the customer entity 119 no longer meets a nexus establishment condition, information indicating a nexus-ending date and how resources are computed relative to the nexus-ending date may be displayed via the resource compliance client 282 on a user interface associated with the account and/or the resource compliance client 282. The resource compliance client 282 may, in various embodiments, be part of or integrated with the browser 281. In other embodiments, the browser 281 may be or perform the operations of the resource compliance client 282, for example, when the software service platform 140 provides web-based services.

In some embodiments, the resource compliance client 282 may communicate and/or obtain services of ERP applications (e.g., ERP system 121), accounting applications, ecommerce applications and/or other applications remote from or resident on the computer 112. For example, the resource compliance client 282 may cause ERP system 121 to transmit a request or other information to the software service platform 140 that invokes services of the software service platform 140 to be provided to the resource compliance client 282 and/or ERP system 121. For example, such information may include information indicative of one or more various conditions being satisfied, including, but not limited to, one or more of: a detected change or update to stored rules about one or more nexus establishment conditions for one or more domains; a detected change or update to information associated with the customer entity 119 that may result in a change in the computed resources for a certain domain; one or more thresholds being met, within a predetermined threshold of being met, or being exceeded regarding information associated with meeting or failing to meet a nexus establishment condition in a certain domain; conditions indicated by stored preferences of customer entity 119, etc.

Additional details about FIG. 2 are provided near the end of this description, for not interrupting the flow of this description at this stage.

Figure 3:
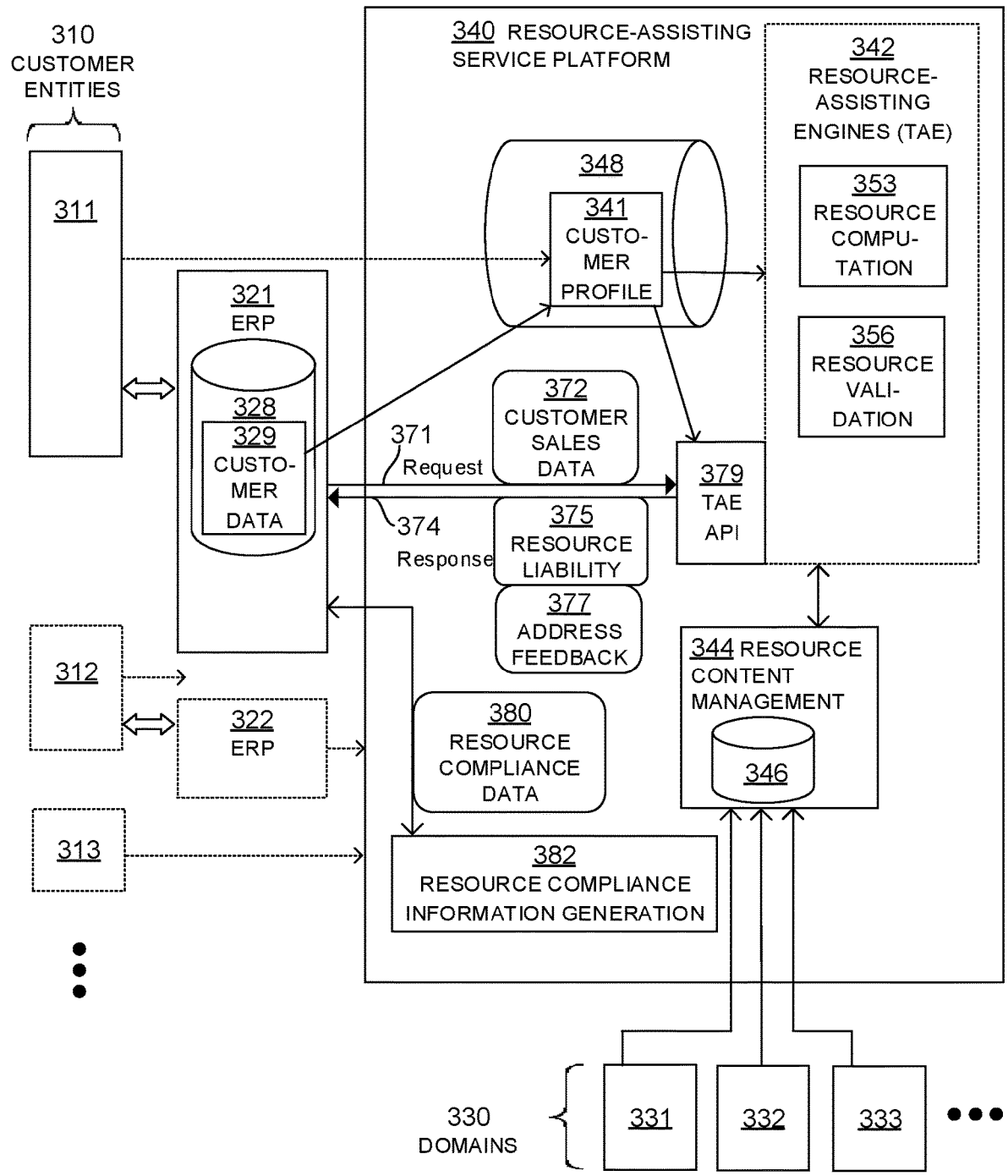
FIG. 3 is a block diagram showing an example software architecture working with a resource compliance information generation engine, according to various embodiments of the present disclosure.

FIG. 3 is a block diagram showing an example software architecture working with a resource compliance information generation engine 382, according to various embodiments of the present disclosure.

In this example, a software-implemented resource-assisting service platform 340 is configured to provide resource-related services. These services may include computing resources in one or more domains 330 for customer entities 310 when the customer entities 310 meet nexus establishment conditions for those domains 330, determining when an entity no longer meets a nexus establishment condition for a domain, and determining if and how to compute resources when the entity no longer meets a nexus establishment condition for a domain. In some embodiments, these services may also include providing notifications to the customer entities 310, monitoring for updated rules regarding nexus establishment conditions, prompting the customer entities 310 for information, etc. Any one of sample customer entities 311, 312, 313, . . . may be as described for customer entity 119. These customer entities 310 may access a software-implemented resource-assisting service platform 340, for receiving its resource-related services.

Aspects of FIG. 3 may be implemented by components described and shown elsewhere in this document, for example with reference to FIG. 1 and FIG. 2. For instance, in some embodiments, customer entities 310 access resource-assisting service platform 340 fully directly, for example as is shown for customer entity 313. In other embodiments, this accessing is performed at least in part indirectly, for example by using Enterprise Resource Planning (ERP) systems 321, 322. In this example, ERP system 321 has a database 328 that stores customer data 329 of customer entity 311, such as sales data or other transaction data. For example, such sales data may be used by the resource compliance information generation engine 382 data to determine potential lack of resource compliance in various domains 330 for the customer entities 310. In this example, resource-assisting service platform 340 includes a database 348, and customer entity 311 has stored their own customer profile 341 in database 348.

Resource-assisting service platform 340 includes a resource content management component 344 for use by TAE 342 and the resource compliance information generation engine 382. Resource content management component 344 may receive resource information from one or more domains 330, such as sample domains 331, 332, 333, . . . . Resource content management component 344 includes a database 346 for storing the received resource information in the form of nexus establishment conditions, resource calculation rules, rates, exemptions, etc. For example, the database 346 may store rules about establishing nexus for purposes of computing resources in the various domains 330. In some embodiments, such rules are rules about meeting or exceeding one or more thresholds regarding information associated with a domain (e.g., sales or use) over a period of time.

Resource-assisting service platform 340 includes resource-assisting engines 342. In some embodiments, TAE 342 includes a resource computation engine 353, and even an address validation engine 356.

In this example, resource-assisting engines 342 may be invoked via a TAE Application Programming Interface (API) 379. Only one TAE API 379 is shown implemented here, while multiple ones may be implemented instead, for example one for invoking each of resource computation engine 353 and address validation engine 356. In this example, TAE API 379 is configured to receive a request 371 or other information from ERP 321. Request 371 has data 372 of customer entity 311. Data 372 may be looked up from customer data 329 in database 328. In various embodiments, data 372 may also or instead be transmitted to one or more of the resource-assisting engines 342 in response to a request from the respective resource-assisting engine. In some embodiments, data 372 may also or instead be pushed to one or more of the resource-assisting engines 342 from one or more of the customer entities 310 and/or ERP system 321, such as in response to the customer data 329 being updated or changed, or on a periodic basis. In response to receiving request 371 with its data 372, TAE API 379 invokes one of resource-assisting engines 342 to perform its service. Then, TAE API 379 is configured to transmit a response 374. Response 374 can be transmitted back to the sender of request 371, or otherwise.

In some embodiments, customer data 329 may be pushed to the resource compliance information generation engine 382 from one or more of the customer entities 310 and/or ERP system 321, such as in response to the customer data 329 being updated or changed, or on a periodic basis. In response to receiving this information the resource compliance information generation engine 382 may perform its service and respond with sending the resource compliance data 380, which may be the resource compliance data 180 of FIG. 1. The resource compliance data 380 may be transmitted back to the sender of the customer data 329, to a corresponding customer entity 310, or otherwise.

In various embodiments, the resource compliance information generation engine 382 may also or instead automatically invoke itself to perform the applicable service in response to one or more various conditions being satisfied, including, but not limited to, one or more of: a detected change or update to stored rules about one or more nexus establishment conditions for one or more domains; a detected change or update to information associated with the customer entity 310 that may result in a change in the computed resources for a certain domain; one or more thresholds being met, within a predetermined threshold of being met, or being exceeded regarding information associated with meeting or failing to meet a nexus establishment condition in a certain domain; conditions indicated by stored preferences of customer entity 310, etc. For example, such stored rules, including the thresholds, may be stored in the database 346 of the resource content management component 344 and accessible by the resource compliance information generation engine 382. Also, records of the resource computation or information associated with the customer entities 310 for resource computation may comprise and/or be part of the customer data 329 and transmitted to the resource compliance information generation engine 382. The stored preferences of one or more of the customer entities 310 may also comprise and/or be part of the customer data 329 and transmitted to the resource compliance information generation engine 382.

In some embodiments, the customer data 329 may be automatically generated and/or transmitted to the resource compliance information generation engine 382, such as by the ERP system 321 and/or one or more of the customer entities 310 in response to one or more various conditions being satisfied, including, but not limited to, one or more of: a detected change or update to stored rules about one or more nexus establishment conditions for one or more domains; a detected change or update to information associated with the customer entity 310 that may result in a change in the computed resources for a certain domain; one or more thresholds being met, within a predetermined threshold of being met, or being exceeded regarding information associated with meeting or failing to meet a nexus establishment condition in a certain domain; conditions indicated by stored preferences of customer entity 310, etc.

In response to such the customer data 329 being automatically generated and/or transmitted to the resource compliance information generation engine 382, or in response to the resource compliance information generation engine 382 invoking itself when certain conditions are satisfied, the resource compliance information generation engine 382 may generate and/or transmit resource compliance data 380 based on received customer data 329. For example, resource compliance data 380 may be or include information about an entity meeting a nexus establishment condition, failing to meet a nexus establishment condition, nexus-ending dates, or other information associated with the computation of resources for a domain in response to the nexus establishment condition being met or no longer being met. The resource compliance information generation engine 382 may periodically, or upon the customer data 329 being updated, receive entity information (e.g., customer sales data) that consists or is included in the customer data 329 for one or more of domains 330 in which resources are computed. The resource compliance information generation engine 382 may then compare the received entity information of the customer data 329 against rules stored in database 346 which are associated with one or more nexus establishment conditions for the domains 330. If, for example, based on the entity information included in the customer data 329, the resource compliance information generation engine 382 determines that the volume of resource use (e.g., sales transactions) of customer entity 311 meet, are within a predetermined threshold of meeting, exceed, or no longer meet a threshold indicated by the rules regarding a nexus establishment condition domain 331, then the resource compliance information generation engine 382 may determine a nexus-ending date for the domain 331 and compute resources according to the rules associated with the domain 331. In various embodiments, the resource compliance information generation engine 382 may perform such a service based on monitoring updates to the rules stored in database 346 and monitoring the information of the customer data 329 for each of the customer entities 310 for each of the domains 330 without needing to receive a specific request for such a service.

In some embodiments, the resource compliance data 380 may be used to update information regarding the meeting or failing to meet a nexus establishment condition for one or more of the domains 330 within an account associated with the one or more customer entities 310. For example, an account associated with the customer entity 311 may be associated with or include customer profile 341 and accessible by the customer entity 311 via the resource-assisting service platform 340, wherein the updated information is for display on a user interface associated with the account. Furthermore, the account associated with the customer entity 311 may be managed, stored and/or accessible by the customer entity 311, the resource-assisting service platform 340, and/or the ERP system 321.

If resource computation engine 353 is invoked by request 371, it may calculate a resource liability of an amount of resource due, based on data 372. In that case, response 374 includes a component of a resource liability 375 that indicates the calculated amount.

If address validation engine 356 is thus invoked by request 371, it may perform an address-validation process, based on data 372. In that case, response 374 includes a component of an address feedback 377. The latter can be a message that an address is valid, or not, or propose a different address.

In some embodiments, resource-assisting service platform 340 may perform a variety of services in addition to what is described above. For one example, resource-assisting service platform 340 may accumulate and store customer sales data 372.

In another example, resource-assisting engines 342 and/or the resource compliance information generation engine 382 may further include one or more additional engines and/or functional components than are shown in the example of FIG. 3. Such additional engines and/or functional components, upon being invoked, can perform additional resource-related services, such as: a) register one or more of customers 310 with one or more appropriate domains 330, b) generate resource returns, i.e., prepare forms for filing by customer entities 310, c) file electronically such returns with the appropriate ones of domain(s) 330, and so on. In some embodiments, one or more of such services may be performed by the TAE 342 and/or the resource compliance information generation engine 382 for one or more of the customer entities 310, or a notification may be transmitted to one or more of the customer entities 310 that such services are available or recommended, in response to a determination by the resource compliance information generation engine 382 that the entity meets or no longer meets a nexus establishment condition for a domain 330 and how resources are to be computed for that domain 330.

The operation of certain aspects of the disclosure will now be described with respect to FIGS. 4-6. In at least one of various embodiments, processes 400, 500, and 600 described in conjunction with FIGS. 4, 5, and 6, respectively, may be implemented by or executed on one or more computing devices, such as resource-assisting service platform 340 of FIG. 3. The following descriptions of processes 400, 500, or 600 discuss the processes being implemented by the resource compliance information generation engine 382 on the resource-assisting service platform 340 of FIG. 3. Embodiments, however, are not so limited and other engines, modules, or computing devices may perform one or more portions of processes 400, 500, or 600.

Figure 4:
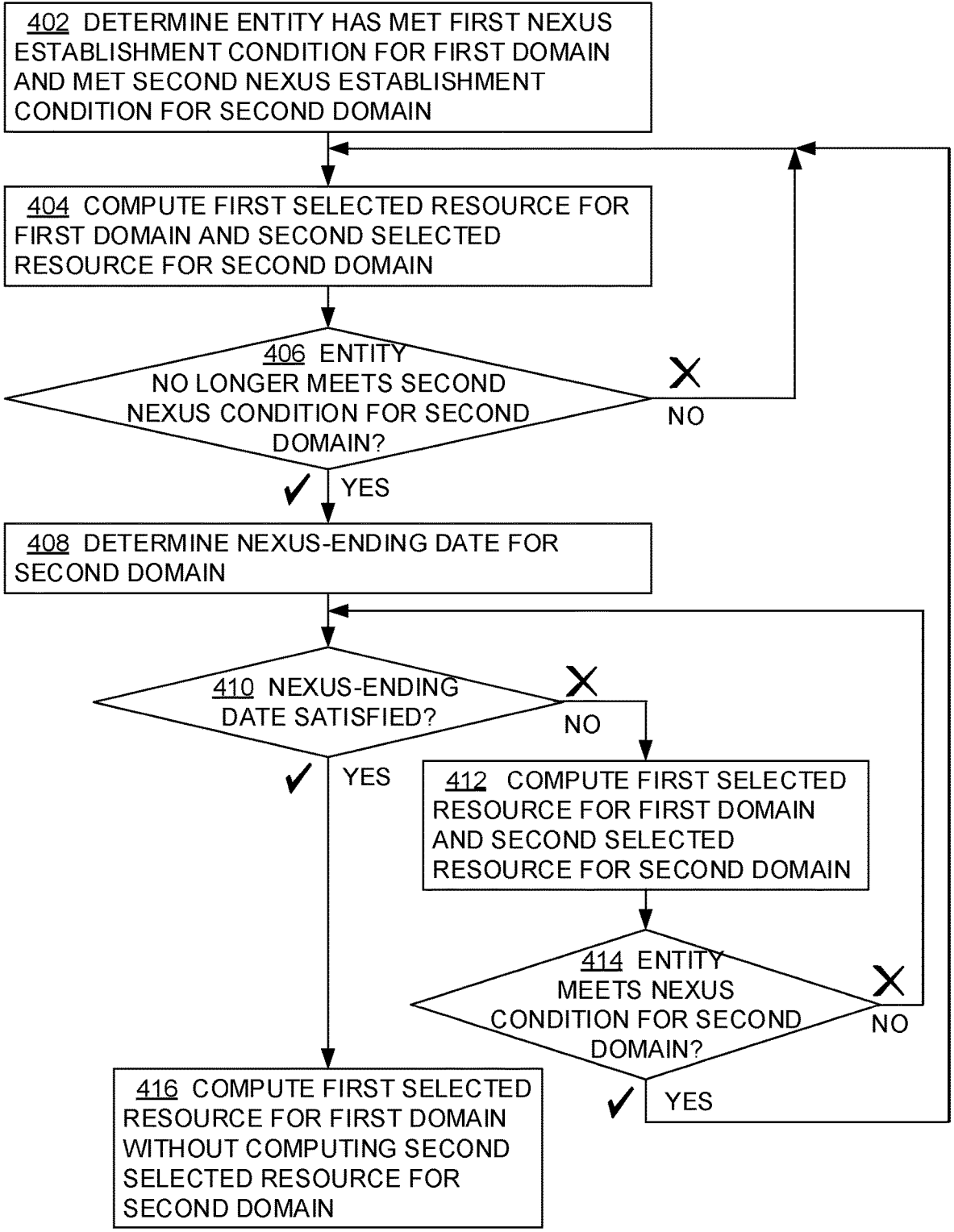
FIG. 4 is a flow diagram of an example process for determining that an entity no longer meets a nexus establishment condition for a domain, according to various embodiments of the present disclosure.

FIG. 4 is a flow diagram of an example process 400 for determining that an entity no longer meets a nexus establishment condition for a domain, according to various embodiments of the present disclosure.

Process 400 begins at block 402, where the resource compliance information generation engine 382 determines that an entity has met a first nexus establishment condition for a first domain and met a second nexus establishment condition for a second domain. Each domain may have one or more rules that determine when the entity has met one or more nexus establishment conditions for that domain. For example, the first domain may have a first plurality of rules that indicate a first plurality of nexus establishment conditions for the first domain and the second domain may have a second plurality of rules that indicate a second plurality of nexus establishment conditions for the second domain. When the entity satisfies one or more of the first rules for the first domain, then the entity has met the first nexus establishment condition for the first domain. And when the entity satisfies one or more of the second rules of the second domain, then the entity has met the second nexus establishment condition for the second domain.

In various embodiments, the resource compliance information generation engine 382 determines that the entity has met the first nexus establishment condition for the first domain based on a comparison of first information regarding the first selected resource for the first domain against stored first rules for the first domain. Similarly, the resource compliance information generation engine 382 determines that the entity has met the second nexus establishment condition for the second domain based on a comparison of second information regarding the second selected resource for the second domain against stored second rules for the second domain.

The following is a brief description of one example of the resource compliance information generation engine 382 determining that the entity has met a first nexus establishment condition for the first domain. This process can also be utilized to determine that the entity has met a second nexus establishment condition for the second domain.

The resource compliance information generation engine 382 may compile transaction data of the entity for the first domain. For example, such transaction data may include data representing a monetary amount of sales (e.g., revenue) associated with the first domain and/or a volume of sales transactions (e.g., number of sales transactions) associated with the first domain. As another example, the transaction data may include data representing an amount of computing resources (e.g., memory and processing power) being utilized by the entity for the first domain. The resource compliance information generation engine 382 may compile such data from one or more sources, including, but not limited to, data customer data 329 from database 328 and/or ERP system 322 of FIG. 3.

The resource compliance information generation engine 382 may aggregate and apportion geographically the compiled transaction data to produce a record of aggregate information, such as for a specific period of time. The resource compliance information generation engine 382 may compare the record of aggregate information to the rules about establishing a nexus for a selected resource for the first domain, which may include one or more predefined, selected, or statutory rule thresholds. The aggregate information exceeds a threshold for at least one rule for the first domain, then the entity has met the first nexus establishment condition for the first domain. In various embodiments, the entity may meet a plurality of nexus establishment conditions for the first domain.

Process 400 proceeds to block 404, where the resource compliance information generation engine 382 computes a first selected resource for the first domain and computes a second selected resource for the second domain during a first time period. This first time period may be a select time period, such as a resource reporting cycle (e.g., one calendar year) or it may be until the entity no longer meets the second nexus establishment condition for the second domain determined at decision block 406.

In various embodiments, the resource compliance information generation engine 382 computes the first selected resource for the entity for the first domain by collecting and aggregating information associated with the first domain and computes the second selected resource for the entity for the second domain by collecting and aggregating information associated with the second domain, as described elsewhere herein. Briefly, for example, the resource compliance information generation engine 382 may compute the first selected resource as the transaction taxes from the entity's sale of goods or services in the first domain (e.g., a particular state, county, city, municipality, etc.) and compute the second selected resource as the transaction taxes from the entity's sale of goods or services in the second domain (e.g., a different state, county, city, or municipality). As another example, the resource compliance information generation engine 382 may compute the first selected resource as an amount of cloud computing resources (e.g., memory usage or processing power) provided by the entity in the first domain and compute the second selected resource as the amount of cloud computing resources provided by the entity in the second domain.

Process 400 continues at decision block 406, where the resource compliance information generation engine 382 determines whether the entity no longer meets the second nexus establishment condition for the second domain. In various embodiments, the entity may no longer meet the second nexus establishment condition if the entity no longer satisfies one or more of the second rules of the second domain. For example, the aggregate information for the second domain may have failed to exceed a threshold for at least one rule for the second domain. If the entity no longer meets the second nexus establishment condition for the second domain, process 400 flows to block 408; otherwise, process 400 loops to block 404, where the resource compliance information generation engine 382 continues to compute the first selected resource for the first domain and the second selected resource for the second domain.

In some embodiments, a first rule that the entity initially satisfied to meet the second nexus establishment condition for the second domain may no longer be satisfied by the entity in the second domain. In this instance, the entity no longer meets the second nexus establishment condition for the second domain. But if the entity satisfies a second rule for the second domain, then the entity may different second nexus establishment condition, which may be considered as the entity still meeting the second nexus establishment condition for the second domain.

At block 408, the resource compliance information generation engine 382 determines a nexus-ending date for the second domain. Each corresponding domain may have separate rules indicating when the selected resource for the corresponding domain is to be computed with respect to the entity no longer meeting a nexus establishment condition for that corresponding domain. In some embodiments, the nexus-ending date for the second domain is the date in which the entity no longer meets the second nexus establishment condition in the second domain. In other embodiments, the nexus-ending date may be a trailing nexus date that is predefined, selected, or determined by one or more statutory rules that may be stored for each of the domains. For example, in some domains, the nexus-ending date may be defined as the end of the calendar or fiscal year following the entity no longer meeting the second nexus establishment condition. In yet other embodiments, the nexus-ending date may be based on a threshold number of consecutive resource-collection cycles in which the entity does not meet the second nexus establishment condition for the second domain.

Process 400 proceeds next to decision block 410, where the resource compliance information generation engine 382 determines whether the nexus-ending date has been satisfied. In various embodiments, this determination is based on a comparison between the nexus-ending date and the current date or when the entity no longer meets the second nexus establishment condition for the second domain. Alone, the comparison between the nexus-ending date and the current date may be determined by whether the nexus-ending date has passed. If the nexus-ending date has been satisfied, process 400 flows to block 416; otherwise, process 400 flows to block 412.

At block 412, the resource compliance information generation engine 382 computes the first selected resource for the first domain and computes the second selected resource for the second domain, similar to block 404, during a second time period. In some embodiments, this second time period may be from the determination that the entity no longer meets the second nexus establishment condition for the second domain until the nexus-ending date is satisfied at decision block 410 or until the entity re-meets the second nexus establishment condition for the second domain or until the entity meets a different second nexus establishment condition for the second domain.

Process 400 continues next at decision block 414, where the resource compliance information generation engine 382 determines whether the entity meets a nexus establishment condition for the second domain, which may be similar to what is performed at block 402 to determine that the entity has met the second nexus establishment condition for the second domain. In some embodiments, the first rule that the entity initially satisfied to meet the second nexus establishment condition for the second domain at block 402 may be re-satisfied at a time after the entity is determined to no longer meet the second nexus establishment condition for the second domain, but before the nexus-ending date. In other embodiments, the entity may satisfy a second rule for the second domain such that the entity meets a different second nexus establishment condition for the second domain.

If the entity meets a nexus establishment condition, whether re-meets the second nexus establishment condition or meets a different second nexus establishment condition, for the second domain, then process 400 loops to block 404, where the resource compliance information generation engine 382 continues to compute the first selected resource for the first domain and the second selected resource for the second domain. Otherwise, process 400 loops to decision block 410, where the resource compliance information generation engine 382 determines whether the nexus-ending date has been satisfied.

If, at decision block 410, the nexus-ending date has been satisfied, process 400 flows from decision block 410 to block 416. At block 416, the resource compliance information generation engine 382 computes the first selected resource for the first domain, but does not compute the second selected resource for the second domain during a third time period. The third time period may begin after the nexus-ending date is satisfied. In some embodiments, the third time period ends when the resource compliance information generation engine 382 determines that the entity again meets a nexus establishment condition for the second domain.

Figure 6:
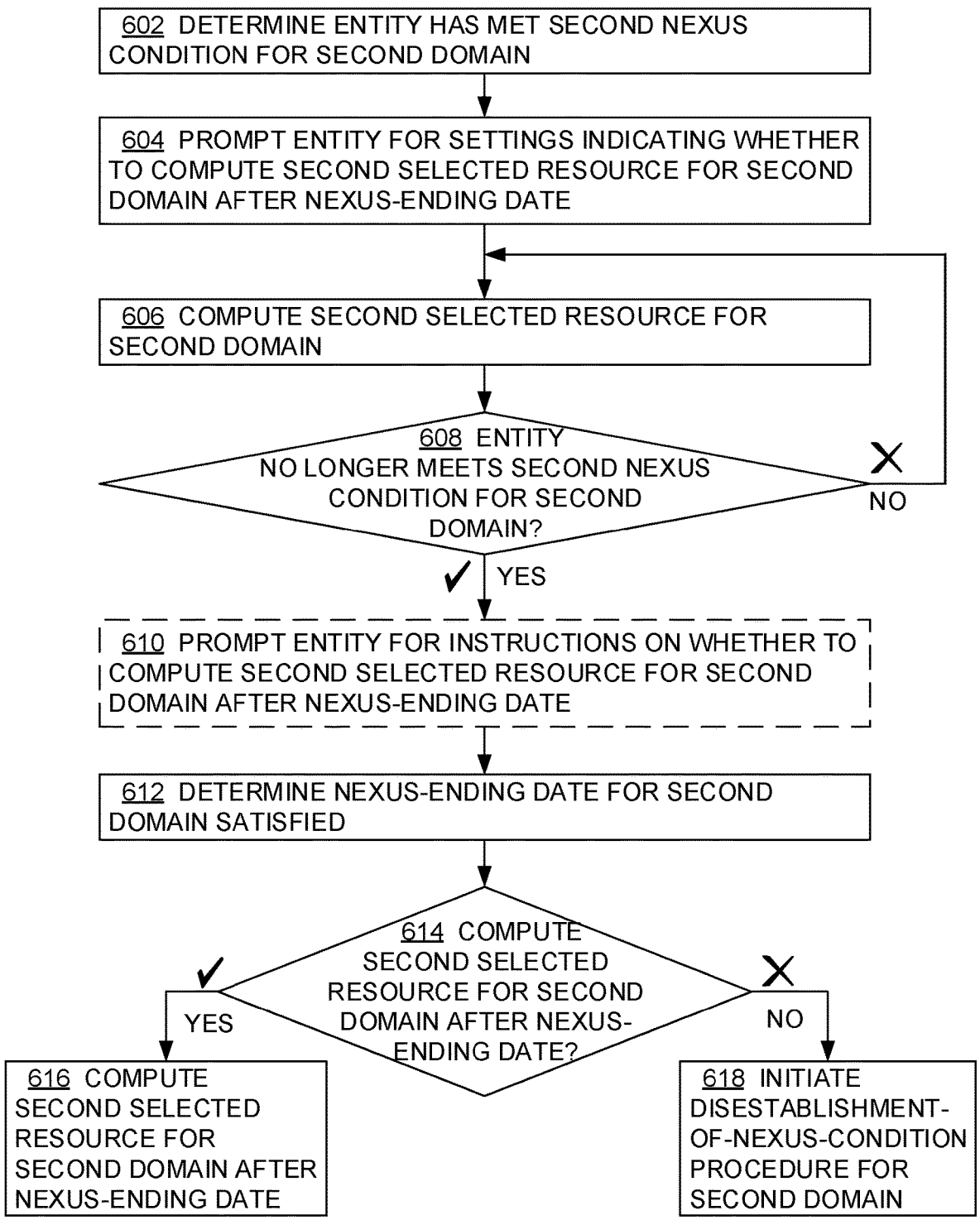
FIG. 6 is a flow diagram of an example process for prompting the entity to determine if resources are to be computed for a domain after the entity fails to meet the nexus establishment condition in that domain, according to various embodiments of the present disclosure.
Figure 7:
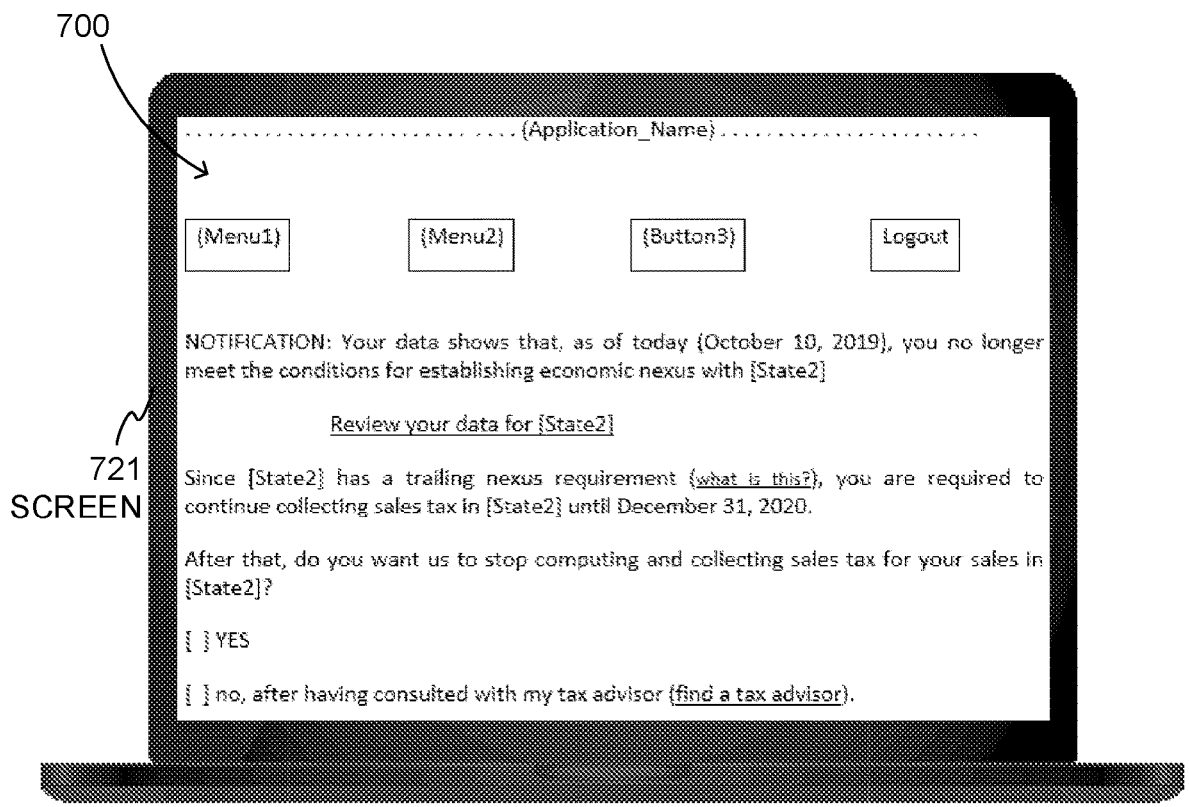
FIG. 7 depicts an example user interface showing an example notification having information regarding failure to meet nexus establishment condition for domain, according to various embodiments of the present disclosure.
Figure 8:
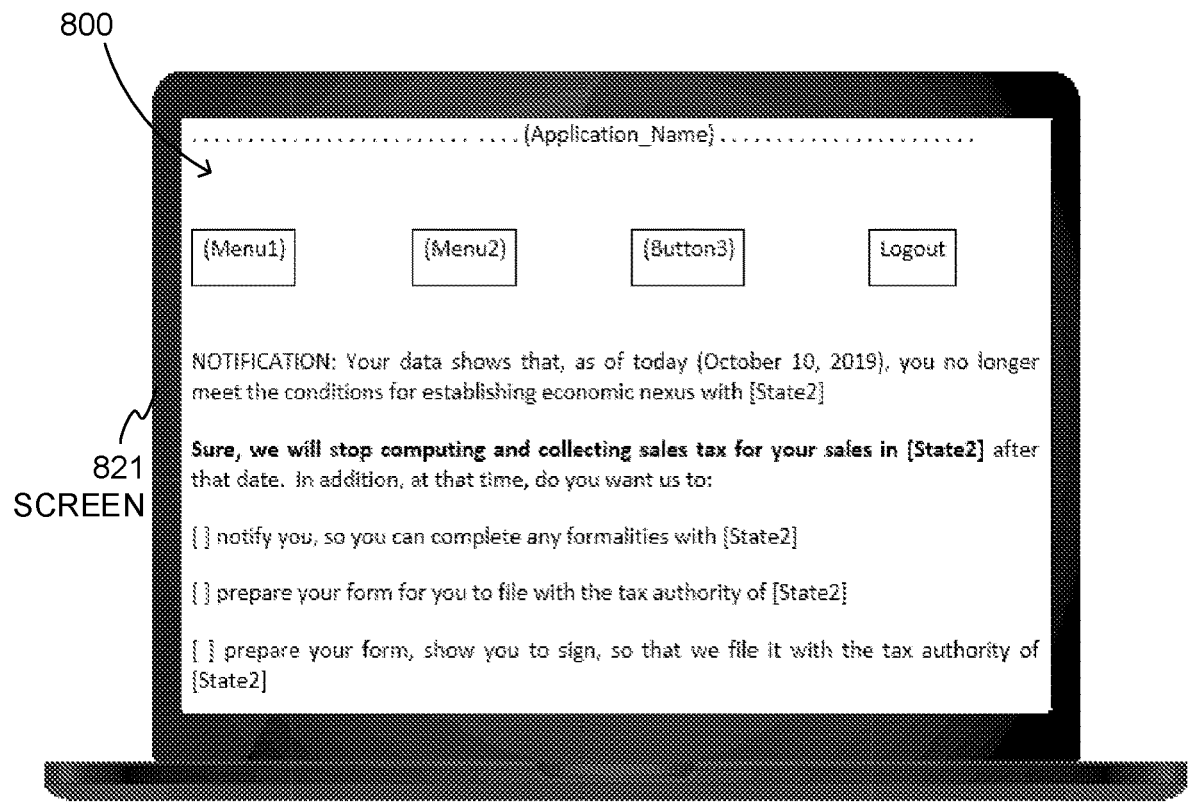
FIG. 8 depicts another example user interface showing an example notification having information regarding failure to meet nexus establishment condition for domain, according to various embodiments of the present disclosure.

In some embodiments, a prompt may have been transmitted to a client computing device of the entity requesting the entity to provide settings indicating whether to terminate computation of the second selected resource for the second domain after the nexus-ending date, such as is described in conjunction with FIG. 6 and illustrated in FIGS. 7 and 8. In various embodiments, this prompt may be an advance setting provided by the entity prior to the entity meeting the second nexus establishment condition for the second domain prior to the first time period. Although in other embodiments, the prompt may be provided to the entity in response to the entity no longer meeting the second nexus establishment condition for the second domain or the nexus-ending date being satisfied for the second domain. In at least one embodiment, the selected resource for the second domain is computed during the third time period unless the entity has provided, in response to the prompt, a setting indicating to terminate the computation of the second selected resource for the second domain after the nexus-ending date in response to the determination that the entity no longer meets the second nexus establishment condition for the second domain.

Although not illustrated, the resource compliance information generation engine 382 can continue to check for whether the entity meets a nexus establishment condition for the second domain, similar to decision block 414. If the entity meets a nexus establishment condition for the second domain, process 400 may loop or restart at block 402.

Figure 5:
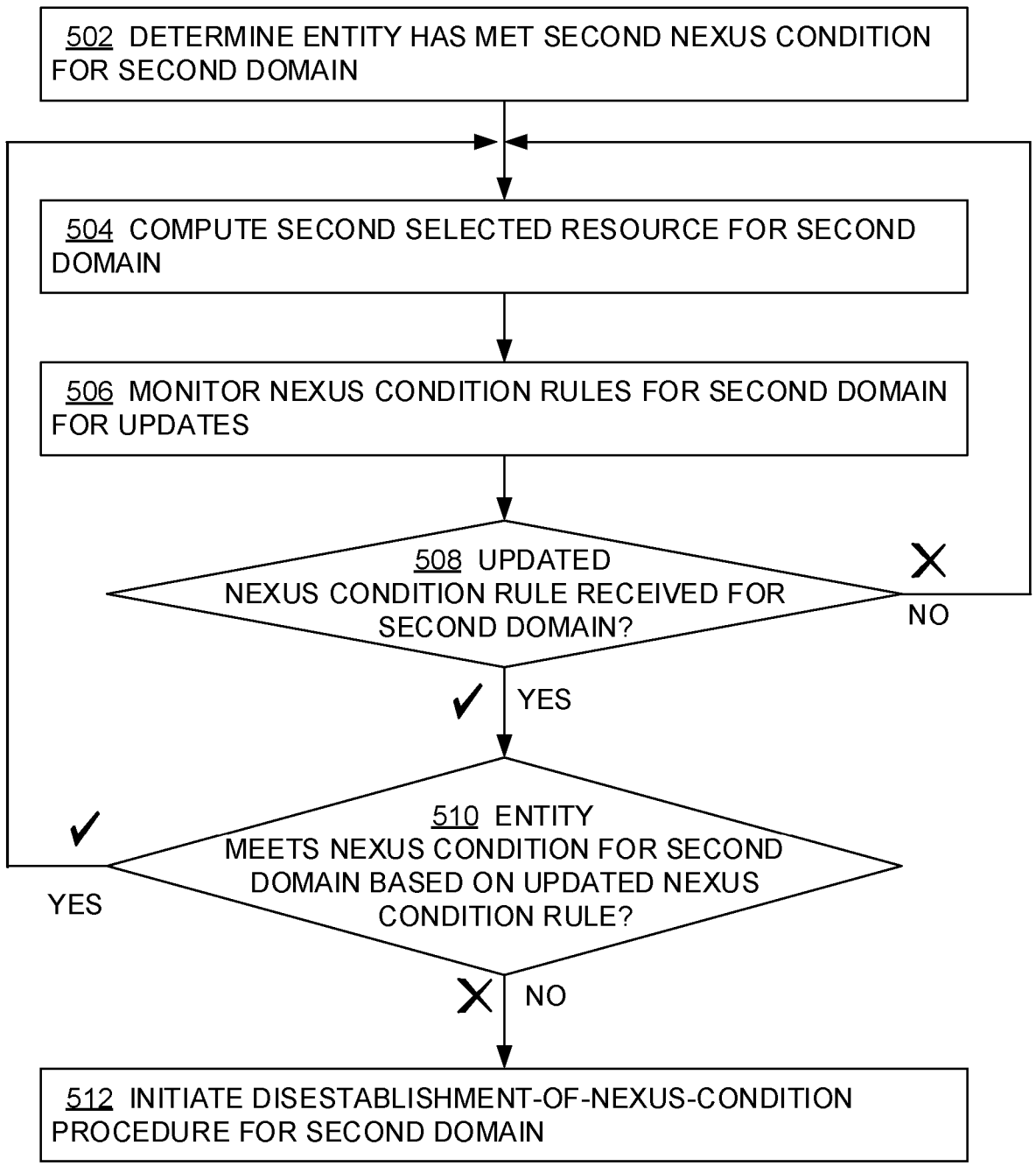
FIG. 5 is a flow diagram of an example process for monitoring nexus establishment conditions rules for a domain to determine if an entity meets a nexus establishment condition for that domain, according to various embodiments of the present disclosure.

FIG. 5 is a flow diagram of an example process 500 for monitoring nexus establishment conditions rules for a domain to determine if an entity meets a nexus establishment condition for that domain, according to various embodiments of the present disclosure.

Process 500 begins at block 502, where the resource compliance information generation engine 382 determines that the entity has met the second nexus establishment condition, similar to what is described at block 402 of FIG. 4.

Process 500 proceeds to block 504, where the resource compliance information generation engine 382 computes the second selected resource for the second domain, similar to what is described at block 404 of FIG. 4.

Process 500 continues at block 506, where the resource compliance information generation engine 382 monitors one or more nexus establishment condition rules for the second domain for updates. In various embodiments, the resource compliance information generation engine 382 may store or access rules that determine when the entity meets a nexus establishment condition for one or more of a plurality of domains. The resource compliance information generation engine 382 monitors these rules for changes. For example, the resource compliance information generation engine 382 may access the rules from one or more sources, including, but not limited to, domains 330 of FIG. 3. Such rules and corresponding updates may be stored in database 346 of FIG. 3.

Process 500 proceeds next to decision block 508, where the resource compliance information generation engine 382 determines whether it has received an updated nexus establishment condition rule for the second domain. If the resource compliance information generation engine 382 has received an updated nexus establishment condition rule, then process 500 flows to decision block 510; otherwise, process 500 loops to block 504.

At decision block 510, the resource compliance information generation engine 382 determines whether the entity meets a nexus establishment condition for the second domain based on the updated nexus establishment condition rule, which is similar to what is described at block 402 in FIG. 4, but utilizes the updated nexus establishment condition rule. In some embodiments, the resource compliance information generation engine 382 may determine that the entity still meets the second nexus establishment condition for the second domain. In other embodiments, the resource compliance information generation engine 382 may determine that the entity meets a different second nexus establishment condition for the second domain. In yet other embodiments, the resource compliance information generation engine 382 may determine that the entity no longer meets any nexus establishment condition for the second domain. If the entity meets a nexus establishment condition for the second domain, then process 500 loops to block 504, where the resource compliance information generation engine 382 computes the second selected resource for the second domain; otherwise, process 500 flows to block 512.

At block 512, the resource compliance information generation engine 382 initiates a disestablishment-of-nexus-condition procedure for the second domain. In various embodiments, the resource compliance information generation engine 382 transmits a notification to the entity indicating that it no longer meets a nexus establishment condition in the second domain. In other embodiments, the resource compliance information generation engine 382 generates and transmits appropriate notifications to the second domain to indicate that the entity no longer meets a nexus establishment condition in the second domain.

In various embodiments, the resource compliance information generation engine 382 performs embodiments of blocks 408, 410, 412, 414, and 416 of FIG. 4 as part the disestablishment of nexus condition procedure. In some embodiments, the resource compliance information generation engine 382 performs embodiments of blocks 610, 612, 614, 616, and 618 of FIG. 6 as part of the disestablishment-of-nexus-condition procedure.

In some embodiments, block 502 may be optional and may not be performed. In one such embodiment, the resource compliance information generation engine 382 does not compute the second selected resource for the second domain at block 504 until after decision block 510, where the resource compliance information generation engine 382 has determined that the entity meets a nexus establishment condition for the second domain based on the updated nexus establishment condition rule.

FIG. 6 is a flow diagram of an example process 600 for prompting the entity to determine if resources are to be computed for a domain after the entity fails to meet the nexus establishment condition in that domain, according to various embodiments of the present disclosure.

Process 600 begins at 602, where the resource compliance information generation engine 382 determines that an entity has met a second nexus establishment condition for a second domain, which is similar to what is described at block 402 of FIG. 4.

Process 600 proceeds to block 604, where the resource compliance information generation engine 382 prompts the entity to establish settings indicating whether the resource compliance information generation engine 382 is to compute the second selected resources for the second domain after the nexus-ending date in the event that the entity no longer meets the second nexus establishment condition for the second domain. In some embodiments, rather than prompting the entity to establish these settings after the entity has met the second nexus establishment condition for the second domain, the resource compliance information generation engine 382 may prompt the entity to establish these settings prior to determining whether the entity has met the second nexus establishment condition for the second domain. In other embodiments, the resource compliance information generation engine 382 may not prompted the entity until after it determines that the entity no longer meets the second nexus establishment condition for the second domain. In which case, block 604 may be optional and may not be performed.

Process 600 proceeds to block 606, where the resource compliance information generation engine 382 computes the second selected resource for the second domain, which is similar to block 404 of FIG. 4.

Process 600 continues at decision block 608, where the resource compliance information generation engine 382 determines whether the entity no longer meets the second nexus establishment condition for the second domain, which is similar to decision block 406 of FIG. 4. If the entity no longer meets the second nexus establishment condition for the second domain, process 600 flows to block 610; otherwise, process 600 loops to block 606, where the resource compliance information generation engine 382 continues to compute the second selected resource for the second domain.

At block 612, the resource compliance information generation engine 382 prompts the entity for instructions on whether to compute the second selected resource for the second domain after the nexus-ending date. One example of a user interface of such a prompt is illustrated in FIG. 8. In some embodiments, block 612 is optional and is not performed, such as when the entity establishes settings indicating whether to compute the second selected resource for the second domain after the nexus-ending date at block 604.

Process 600 proceeds next to block 612, where the resource compliance information generation engine 382 determines that the nexus-ending date for the second domain is satisfied, which is similar to blocks 408 and 410 of FIG. 4.

Process 600 continues next at decision block 614, where the resource compliance information generation engine 382 determines whether to compute the second selected resource for the second domain after the nexus-ending date. In various embodiments, the resource compliance information generation engine 382 determines that it is to compute the second selected resources based on the settings initially established by the entity at block 602, such as if the entity affirmatively indicates that the resource compliance information generation engine 382 is to compute the second selected resource for the second domain after the nexus-ending date. In other embodiments, the resource compliance information generation engine 382 determines that it is to compute the second selected resources based on the input provided by the entity at block 610, such as if the entity affirmatively selects an option indicating that the resource compliance information generation engine 382 is to compute the second selected resource for the second domain after the nexus-ending date. If the resource compliance information generation engine 382 is to compute the second selected resource for the second domain after the nexus-ending date, then process 600 flows to block 616, where the resource compliance information generation engine 382 computes the second selected resource for the second domain after the nexus-ending date similar to block 606; otherwise, process 600 flows to block 618.

At block 618, the resource compliance information generation engine 382 initiates a disestablishment-of-nexus procedure for the second domain, which is similar to block 512 of FIG. 5.

Use Case Example

Businesses often have to compute an amount of a resource that is realized when performing various business functions. One example use case that utilizes embodiments described herein may be for purposes of calculating transaction taxes. For example, when businesses make, sell, or buy goods, they are required by law to compute the amounts of money they must remit as taxes to various tax domains, and then remit these amounts to the tax domains. If they fail to accurately report and remit taxes, they may be subject to audits and fines—and ignorance of the law is not an excuse.

There are many types of taxes for businesses. Such taxes include sales tax, use tax, excise tax, value-added tax, industry-specific taxes, cross-border taxes, and so on (collectively referred to herein as "transaction taxes"). Further, for a single transaction, taxes may be due to more than one tax domain, such as different states, localities within the states, counties, cities, municipalities, etc.

Determining the taxes due is often very complex. There are over 10,000 domains or tax jurisdictions in the US, and almost 10 million taxability rules related to various products and services. Complexities in determining the sales tax due may arise from the location of the buyer, the seller, a distributor, etc. For example, some state and local authorities tax have origin-based rules, which means that a sales tax is charged from the seller's location; other state and local authorities tax have destination-based rules, which means that a sales tax is charged from the buyer's location. Additional complexities arise from the fact that different tax jurisdictions charge different percentage rates. These different tax jurisdictions can be different states, counties, cities, municipalities, special taxing jurisdictions, and so on.

In addition to calculating the cost of the tax, sellers of goods and services are subjected to many requirements about the taxes they must collect and remit. In particular, a seller must determine whether, and when, they must collect and remit transaction taxes in each tax jurisdiction. For example, for each state, a seller may need to register with that state's taxing agency, set up internal processes for collecting sales tax in accordance with the tax rules of the state, keep records for the collected sales tax, file reports with the state, and finally pay the tax to the state. In the U.S., retailers must have some kind of presence in a state before that state can require that retailer to collect and remit sales tax from buyers in that state. With the Supreme Court ruling in the South Dakota v. Wayfair case, not only does physical presence (such as a location, employee or inventory), but "economic" presence in a state may create sales tax nexus. In other words, due to the Wayfair ruling, even if a retailer does not have a physical presence in a state, if the retailer passes a state's economic threshold, for example, for total revenue or number of transactions in that state, the retailer is legally obligated to collect and remit sales tax to that state. However, different states have different thresholds for determining whether there is an economic nexus, which provides a problem for retailers in determining whether they are compliant with the tax rules in various jurisdictions, especially when the retailers have ever changing total revenue and numbers of transactions in various different jurisdictions.

Embodiments described herein may be utilized (e.g., by system 100 of FIG. 1 or resource compliance information generation engine 382 of FIG. 3) to determine that an entity has met a first nexus establishment condition for a first tax jurisdiction for purposes of collecting transaction taxes in the first tax jurisdiction and has met a second nexus establishment condition for a second domain for purposes of collecting transaction taxes in the second tax jurisdiction; compute a first transaction tax for the first tax jurisdiction and a second transaction tax for the second tax jurisdiction during a first time period associated with meeting the first nexus establishment condition and the second nexus establishment condition; determine, that the entity no longer meets the second nexus establishment condition for the second domain after the first time period; determine, in response to the determination that the entity no longer meets the second nexus establishment condition for the second tax jurisdiction, a nexus-ending date for the second tax jurisdiction based on stored rules regarding a nexus-ending date for the second tax jurisdiction; compute the first transaction tax for the first tax jurisdiction and the second transaction tax for the second tax jurisdiction during a second time period after the first time period and prior to the nexus-ending date; and compute the first transaction tax for the first tax jurisdiction without computing the second transaction tax for the second tax jurisdiction during a third time period after the nexus-ending date based on the determination that the entity no longer meets the second nexus establishment condition for the second tax jurisdiction after the first time period and on the determined nexus-ending date for the second tax jurisdiction.

A record of aggregate transactions for the entity for a given period of time may be compared to rules about establishing nexus for purposes of remitting transaction tax in a plurality of tax jurisdictions, which may include statutory rule threshold records that include rules regarding a monetary amount of sales that are associated with each of various tax jurisdictions and/or a volume of sales transactions that are associated with each of various tax jurisdictions. Below are some examples of such rules for a sample group of individual tax jurisdictions in the U.S.

Rhode Island
    Effective date: Jul. 1, 2019
    Included transactions: Sales of tangible personal property, prewritten computer software, and vendor-hosted prewritten software delivered electronically or by load and leave, and/or taxable services
    Treatment of exempt transactions: Exempt sales are included but exempt services are not included in the threshold count
    Trigger: Sales or transactions
    Sales/transactions threshold: $100,000 or 200 transactions
    Evaluation period: Threshold applies to the preceding calendar year
    Nexus-ending date: December 31 of the year following evaluation period Texas
    Effective date: Oct. 1, 2019
    Included transactions: Sales of products and taxable services into the state
    Treatment of exempt transactions: Exempt sales and exempt services are included in the threshold count
    Trigger: Sales only
    Sales/transactions threshold: $500,000
    Evaluation period: Threshold applies to the previous 12-months, with the initial 12 calendar months beginning Jul. 1, 2018 through Jun. 30, 2019
    Nexus-ending date: Date when sales/transaction threshold is no longer met The system described herein utilizes these stored rules for one or more of a plurality of tax jurisdictions, where there stored rules indicate when a nexus establishment condition is met for purposes of remitting transaction tax in the certain tax jurisdiction. The system may also monitor for changes in rules for the plurality of tax jurisdictions and update the stored rules accordingly.

The system compares stored information about goods or services sold by an entity in the certain tax jurisdiction against the stored rules for the certain tax jurisdiction. The comparing may include determining whether one or more thresholds regarding goods or services sold by the entity for establishing nexus for purposes of remitting transaction tax in the certain tax jurisdiction are met, are within a predetermined threshold of being met, or are exceeded.

For example, the system may find in the record of aggregate transactions that a customer entity has total sales of $550,000 of products and taxable services into Texas in the 12 months beginning Jul. 1, 2018 through Jun. 30, 2019. The tax compliance information generation engine 382 may then search the statutory rule threshold records and find that the statutory threshold for Texas is $500,000. The tax compliance information generation engine 382 may then compare the $550,000 in total sales in Texas for customer entity to the statutory threshold for Texas of $500,000 and record that it exceeds this statutory threshold for Texas—and thus the entity meets the nexus establishment condition for Texas. The tax compliance information generation engine 382 may perform such comparisons for various different customer entities for various different tax jurisdictions. For example, the tax compliance information generation engine 382 may find in the record of aggregate transactions that customer entity has a total of 185 transactions for sales of tangible personal property into Rhode Island in the preceding calendar year. The tax compliance information generation engine 382 may then search the statutory rule threshold records and find that the statutory threshold for Rhode Island is $100,000 total sales or 200 transactions. The tax compliance information generation engine 382 may then compare the 185 total number of transactions apportioned to Rhode Island for customer entity to the statutory threshold for Rhode Island of 200 transactions and record that it is approaching this statutory threshold for Rhode Island (e.g., within a threshold number of 20 transactions of the 200 transaction threshold)—and thus the entity meets the nexus establishment condition for Rhode Island. Other thresholds may be used to determine whether the statutory threshold is being approached and such thresholds may be selectable by the customer entity and/or the tax compliance information generation engine 382.

The system then computes the transaction taxes for the those tax jurisdictions meeting a nexus establishment condition, e.g., where the one or more thresholds regarding sales associated with requirements to remit transaction taxes for the tax jurisdiction are met, are within a predetermined threshold of being met, or are exceeded—in this example, transaction taxes are computed for both Texas and Rhode Island.

When the stored rules are updated or there is a change in the stored information about goods or services sold by the entity in a tax jurisdiction or during a new tax cycle, the system compares the stored information (or updated information) about goods or services sold by the entity with the stored rules (or updated stored rules) to determine if the entity still meets the nexus establishment condition for that tax jurisdiction or if it no longer meets the nexus establishment condition for that tax jurisdiction. For example, the transactions in Rhode Island may be reduced to 110 transactions or the Rhode Island rules may change the statutory threshold to be 300 transactions, both of which may result in the entity no longer meeting the nexus establishment condition for Rhode Island.

If the entity no longer meets the nexus-establishment condition for a tax jurisdiction, then the system determines a nexus-ending date for that tax jurisdiction. The nexus-ending date may be the date in which the entity no longer meets a nexus establishment condition for the tax jurisdiction or a trailing nexus that is a particular date after the entity no longer meets the nexus establishment condition (e.g., the last day of the next calendar year). Continuing the example above, if the entity no longer meets the rules for the nexus establishment condition for Rhode Island, then the nexus-ending date is December 31 of the calendar year following the year in which the entity no longer met the Rhode Island nexus establishment condition.

The system continues to compute the transaction taxes for the entity in those tax jurisdictions where the entity still meets the nexus establishment condition and in those tax jurisdictions where the entity no longer meet the nexus establishment condition but the nexus-ending date has not passed or been satisfied. Therefore, in this example, transaction taxes are still computed for both Texas and Rhode Island.

But after the nexus-ending date for a tax jurisdiction where the entity no longer meets the nexus establishment condition, the system halts calculating the transaction taxes in that tax jurisdiction. For example, after December 31 of the calendar year following the year in which the entity no longer meets the nexus establishment condition in Rhode Island, the system does not compute the transaction tax for Rhode Island. But the system does continue to compute the transaction tax for Texas. If one or more thresholds regarding sales associated with requirements to remit transaction taxes for the tax jurisdiction are met, are within a predetermined threshold of being met, or are exceeded prior to the nexus-ending date, then the system continues to compute transaction tax for that tax jurisdiction.

In some embodiments, the entity may be prompted, with notifications and so on. Prompting can be to confirm that transaction taxes will stop being computed and collected after the nexus-ending date.

FIG. 7 depicts an example user interface 700 on a screen 721, which can be as described for screen 221. User interface 700 shows an example notification having information regarding failure to meet nexus establishment condition for a domain, according to various embodiments of the present disclosure. In this particular example, user interface 700 informs the entity that, as of Oct. 19, 2019, it no longer meets the nexus establishment condition for "State2." It should be noted, however, that embodiments permit for the date when the nexus establishment condition is met or not met can be different from a date when nexus ends. This is also the case in this example: The user interface 700 indicates that "State2" has a trailing nexus requiring transaction taxes to be collected until Dec. 31, 2020, similar to what is described above in the example discussing the trailing nexus for Rhode Island. The entity can then select "yes" to stop computing the transaction tax after the trailing nexus date or the entity can select "no" to continue computing the transaction tax after the trailing nexus date. In various embodiments, the user interface 700 may provide information indicating that the entity should seek counsel of a third party in some situations.

FIG. 8 depicts another example user interface 800 on a screen 821, which can be as described for screens 221, 721. User interface 800 shows an example notification having information regarding failure to meet nexus establishment condition for a domain, according to various embodiments of the present disclosure. In this particular example, user interface 800 informs the entity that, as of Oct. 10, 2019, it no longer meets the nexus establishment condition for "State2." The user interface 800 indicates that the transaction tax will no longer be calculated for "State2" as of that date (e.g., the nexus-ending date is the date the entity no longer meets the nexus establishment condition), similar to the example above for Texas. The entity can then select a first option to be notified that "State2" requires formal paperwork to be filed indicating that the nexus establishment condition is no longer met. The entity can also select a second option to have the system automatically initiate disestablishment of nexus for "State2" by automatically generating the proper filing paperwork for "State2" to be filed by the entity. Or the entity can select a third option to have the system automatically initiate disestablishment of nexus for "State2" by automatically generating and filing the proper filing paperwork for "State2."

Although this example discusses the computation of transaction taxes for tax jurisdictions, embodiments described herein can be utilized to compute other types of selected resources for one or more domains where each domain has different rules regarding when and how the selected resources are computed.

ADDITIONAL DETAILS

Additional details about FIG. 1 and FIG. 2 are now provided. Computer 112 further includes a video adapter 211, which is also coupled to system bus 232. Video adapter 211 may be able to drive and/or support a screen 221 that is used by user 192 together with computer 112.

In addition to screen 221, other peripheral input/output (I/O) devices that may be used together with computer 112 include a keyboard 222, a mouse 223, a media tray 224 and a printer 225. Media tray 224 may include storage devices such as CD-ROM drives, multi-media interfaces, and so on. Computer 112 moreover includes an I/O interface 228 connected to these peripheral I/O devices as shown, for the purpose of communicating with them. In this example these connections are direct. Alternately, one or more of these connections may take place via universal serial bus (USB) ports 229 of computer 112, to which I/O interface 228 is also connected.

Computer 112 moreover includes a bus bridge 216 coupled to system bus 232, and an input/output (I/O) bus 236. I/O bus 236 is coupled to bus bridge 216 and to I/O interface 228.

Computer 112 also includes various memory components. A non-volatile memory component is a hard drive 244. Computer 112 further includes a hard drive interface 242 that is coupled to hard drive 244 and system bus 232.

Additional memory components are in a system memory 248, which is also coupled to system bus 232. System memory includes volatile memory including, but not limited to, cache memory, registers and buffers. In embodiments, data from hard drive 244 populates registers of the volatile memory of system memory 248.

Sample system memory 248 has a software architecture that uses a stack of layers, with each layer providing a particular functionality. In this example the layers include— starting from the bottom—an operating system (OS) 250, libraries 260, frameworks/middleware 270 and application programs 280. Other software architectures may include less, more or different layers. For example, a presentation layer may also be included. For another example, some mobile or special purpose operating systems may not provide a frameworks/middleware 270.

OS 250 may manage hardware resources and provide common services. Libraries 260 provide a common infrastructure that is used by applications 280 and/or other components and/or layers. Libraries 260 provide functionality that allows other software components to perform tasks in a more easy fashion than to interface directly with the specific underlying functionality of OS 250. Libraries 260 may include system libraries 261, such as a C standard library. System libraries 261 may provide functions such as memory allocation functions, string manipulation functions, mathematical functions, and the like.

In addition, libraries 260 may include API libraries 262 and other libraries 263. API libraries 262 may include media libraries, such as libraries to support presentation and manipulation of various media formats such as MPREG4, H.264, MP3, AAC, AMR, JPG, and PNG. API libraries 262 may also include graphics libraries, for instance an OpenGL framework that may be used to render 2D and 3D in a graphic content on screen 221. API libraries 262 may further include database libraries, for instance SQLite, which may support various relational database functions. API libraries 262 may additionally include web libraries, for instance WebKit, which may support web browsing functionality.

Frameworks/middleware 270 may provide a higher-level common infrastructure that may be used by applications 280 and/or other software components/modules. For example, frameworks/middleware 270 may provide various graphic user interface (GUI) functions, high-level resource management, high-level location services, and so forth. Frameworks/middleware 270 may provide a broad spectrum of other APIs that may be used by applications 280 and/or other software components/modules, some of which may be specific to OS 250 or to a platform.

Application programs 280 are also known more simply as applications and apps. One such app is a browser 281. Browser 281 is an example of a renderer, which includes program modules and instructions that enable computer 112, to exchange network messages with network 194 using hypertext transfer protocol (HTTP) messaging.

Other such applications 280 may include a contacts application, a book reader application, a location application, a media application, a messaging application, and so on. Applications 280 may be developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. Applications 280 may use built-in functions of OS 250, libraries 260, and frameworks/middleware 270 to create user interfaces for user 192 to interact with.

The hardware elements depicted in computer 112 are not intended to be exhaustive. Rather, they are representative, for highlighting essential components that can be used with embodiments.

Instructions for performing any of the methods or functions described herein may be stored, completely or partially, within the memory components of server computer 141, computer 112, etc. These memory components include the indicated memory components, plus cache memory within the processors such as processor 214. Accordingly, these memory components are examples of machine-readable media.

In this context, "machine-readable medium" or "computer-readable medium" refers to a component, device or other tangible media able to store instructions and data temporarily or permanently and may include, but is not limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing.

The term "machine-readable medium" or "computer-readable medium" should be taken to include a single medium or multiple media (e.g., a centralized or distributed database, or associated caches and servers) able to store instructions that a machine such as a processor can store, erase, or read. The term "machine-readable medium" or "computer-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Processor 214, as well as the processor of server computer 141, is a physical circuit that manipulates physical quantities representing data values. The manipulation can be according to control signals, which can be known as commands, op codes, machine code, etc. The manipulation can produce corresponding output signals that are applied to operate a machine. As such, a processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The claimed invention is:

1. A system, comprising:
   at least one processor; and
   a memory coupled to the at least one processor, the memory storing instructions that, when executed by the at least one processor, cause the system to perform operations comprising:
      determining that an entity has met a first nexus establishment condition for a first domain and has met a second nexus establishment condition for a second domain;
      computing a first selected resource for the first domain and a second selected resource for the second domain during a first time period associated with meeting the first nexus establishment condition and the second nexus establishment condition;
      determining that the entity no longer meets the second nexus establishment condition for the second domain after the first time period;
      determining, in response to the determination that the entity no longer meets the second nexus establishment condition for the second domain, a nexus-ending date for the second domain based on stored rules regarding a nexus-ending date for the second domain;

computing the first selected resource for the first domain and the second selected resource for the second domain during a second time period after the first time period and prior to the nexus-ending date; and computing the first selected resource for the first domain without computing the second selected resource for the second domain during a third time period after the nexus-ending date based on the determination that the entity no longer meets the second nexus establishment condition for the second domain after the first time period and on the determined nexus-ending date for the second domain.

2. The system of claim 1, in which determining the nexus-ending date includes:
determining the nexus-ending date as a date when the entity no longer meets the second nexus establishment condition for the second domain.

3. The system of claim 1, in which determining the nexus-ending date includes:
determining the nexus-ending date as a selected-resource-computation-cycle end date after the entity no longer meets the second nexus establishment condition for the second domain.

4. The system of claim 1, in which determining the nexus-ending date includes:
determining the nexus-ending date as a date after a trailing-nexus period that followed a selected-resource-computation-cycle end date after the entity no longer meets the second nexus establishment condition for the second domain.

5. The system of claim 1, in which the instructions, when executed by the at least one processor, further cause the system to perform operations comprising:
periodically determining whether the entity has maintained the second nexus establishment condition during the first time period for the second domain.

6. The system of claim 1, in which the instructions, when executed by the at least one processor, further cause the system to perform operations comprising:
in response to determining the nexus-ending date for the second domain, transmitting, to a client computing device associated with the entity, information requesting the entity to confirm termination of computing the second selected resource for the second domain after the nexus-ending date.

7. The system of claim 6, in which the instructions, when executed by the at least one processor, further cause the system to perform operations comprising:
receiving, from the client computing device, input requesting continued computing of the second selected resource for the second domain after the nexus-ending date; and
transmitting, to the client computing device, information informing the entity to consult a third party.

8. The system of claim 1, in which the instructions, when executed by the at least one processor, further cause the system to perform operations comprising:
transmitting, to a client computing device associated with the entity, a prompt requesting the entity to provide settings indicating whether to terminate computation of the second selected resource for the second domain after the nexus-ending date in response to a determination that the entity no longer meets the second nexus establishment condition for the second domain, and in which the selected resource for the second domain is computed during the third time period unless the entity has provided, in response to the prompt, a setting indicating to terminate the computation of the second selected resource for the second domain after the nexus-ending date in response to the determination that the entity no longer meets the second nexus establishment condition for the second domain.

9. The system of claim 1, in which the instructions, when executed by the at least one processor, further cause the system to perform operations comprising:
during the second time period, determining that the entity has re-met the second nexus establishment condition for the second domain; and
restarting the first time period in which the first selected resource is computed for the first domain and the second selected resource is computed for the second domain.

10. The system of claim 1, in which the instructions, when executed by the at least one processor, further cause the system to perform operations comprising:
during the second time period, determining that the entity has met a different second nexus establishment condition for the second domain; and
restarting the first time period in which the first selected resource is computed for the first domain and the second selected resource is computed for the second domain.

11. The system of claim 1, in which the instructions, when executed by the at least one processor, further cause the system to perform operations comprising:
transmitting, to a client computing device associated with the entity, a notification indicating that the entity no longer meets the second nexus establishment condition for the second domain.

12. The system of claim 1, in which the instructions, when executed by the at least one processor, further cause the system to perform operations comprising:
transmitting, to a client computing device associated with the entity, a notification indicating the nexus-ending date for the second domain.

13. The system of claim 1, in which the instructions, when executed by the at least one processor, further cause the system to perform operations comprising:
in response to determining that the entity no longer meets the second nexus establishment condition for the second domain, transmitting, to a client computing device associated with the entity, a notification instructing the entity to initiate a disestablishment-of-nexus process with the second domain.

14. The system of claim 1, in which initiating the disestablishment-of-nexus period includes:
transmitting, to a client computing device associated with the entity, a notification instructing the entity to file disestablishment-of-nexus paperwork with the second domain.

* * * * *